United States Patent [19]

Maeda et al.

[11] Patent Number: 4,758,838
[45] Date of Patent: Jul. 19, 1988

[54] METHOD OF RECONSTRUCTING IMAGES FROM SYNTHETIC APERTURE RADAR'S DATA

[75] Inventors: Akira Maeda, Machida; Akira Tsuboi, Tokyo; Fuminobu Komura, Yokohama, all of Japan

[73] Assignee: Hitachi, Ltd., Tokyo, Japan

[21] Appl. No.: 767,046

[22] Filed: Aug. 19, 1985

[30] Foreign Application Priority Data

Sep. 7, 1984 [JP] Japan .................. 59-186317

[51] Int. Cl.[4] .......................... G01S 13/89
[52] U.S. Cl. ..................... 342/25; 342/196
[58] Field of Search .......... 343/5 CM, 5 FT; 342/25, 342/195–197

[56] References Cited

U.S. PATENT DOCUMENTS 4,084,158  4/1978  Slawsby ................ 343/5 CM

FOREIGN PATENT DOCUMENTS 0120771  2/1983  Japan ................. 343/5 FT

OTHER PUBLICATIONS

R. Okkes, "Signal Processing Aspects of Space Borne Sar Systems"; EOSMPR Conf., Record, pp. 421–428; 3/78.
C. Wu; "Software-Based System to Produce Seasat SAR Imagery"; ESA SP-1031 (9/80), pp. 7–13.
Ando, "SAR and Indirect Measuring Technique"; *Measurement and Control*, (vol. 22, No. 2; 2/83), pp. 27–36.
Bennett et al., "Digital SAR Image Formation Airborne and Satellite Results", Proc.s of 13th Intl. Symposium on Remote Sensing of Environment, pp. 337–348 (1979).

*Primary Examiner*—Thomas H. Tarcza
*Assistant Examiner*—Bernarr Earl Gregory
*Attorney, Agent, or Firm*—Antonelli, Terry & Wands

[57] ABSTRACT

A method of reconstructing original images from synthetic aperture radar image data, wherein in order to speed up the reconstruction of an original image from image data provided by synthetic aperture radar (SAR), the process for generating a point image pattern in correspondence to each point on the original image and the fast Fourier transformation (FFT) process for the generated point image pattern and 1-line image data are carried out once for every certain number of lines. Positional and phase displacement created on a reconstructed image are corrected by multiplying a phase rotation factor to the product of the FFT-processed point image pattern and 1-line image data.

2 Claims, 3 Drawing Sheets

METHOD OF RECONSTRUCTING IMAGES FROM SYNTHETIC APERTURE RADAR'S DATA

BACKGROUND OF THE INVENTION

1. Field of the Invention

The present invention relates to a digital processing system for reconstructing recognizable images from surveillance data collected with a synthetic aperture radar (SAR) installed on a satellite or aircraft, and particularly to an image reconstruction method suitable for reconstructing high-quality images at a high processing speed.

2. Description of the Prior Art

In the field of remote sensing using a satellite or aircraft, use is made of SAR which operates in microwave frequencies to provide high resolution images of the ground surface without the influence of clouds. The SAR equipment including a radar sensor and transmission antenna installed on a satellite picks up images of the ground surface from its orbit. Image data sent from the SAR equipment is received by the ground station, in which data is processed to reconstruct images on film and in a magnetic data file.

The following describes in brief the processing of SAR data. More detailed description about SAR is given, for example, in an article entitled "Synthetic Aperture Radar and Remote Sensing Technique" by Ando, Measurement and Control, Vol. 22, No. 2; J. R. Bennett et al "Digital SAR Image Formation Airborne and Satellite Results", Proceedings of 13th International Symposium on Remote Sensing of Environment, pp. 337-348 (1979).

In the received image of SAR, radar echo from a point on the ground surface is distributed with a spread as defined by a point image pattern h(x, y), where x and y represent the range and azimuth directions, and the image cannot be used in its original form. To obtain a ground surface pattern, the received image is first compressed in the range direction, and then compressed in the azimuth direction. The range compression is implemented through a correlation process for each line of image data with point image pattern data. In this case, direct execution of the correlation process takes a lot of time, and therefore the process is sped up using the technique of frequency domain matched filtering with fast Fourier transformation (FFT), complex multiplication and inverse fast Fourier transformation (IFFT). In order to carry out the correlation process using FFT, a point image pattern is generated by computer digital processing, and the FFT of the point image pattern and the FFT of one line of image data are calculated. Since correlation of two sets of data becomes a mere multiplication of the results of the FFT calculation of the data in the frequency domain after the FFT calculation has been made the correlation result for one line of image data is obtained by multiplying the results of the FFT calculation of the above two sets of data and making the IFFT calculation of the result of the multiplication.

A point image pattern in the range compression process is specific to the SAR sensor system and is considered to be completely invariable at least in one scene. On this account, it is sufficient to carry out the point image pattern generation and successive FFT process once for the process of each scene, and this processing time is negligibly small relative to the overall SAR image reconstruction processing time.

The subsequent azimuth compression process is also sped up using the FFT technique, but a point image pattern in this process is dependent on the distance and relative speed between the SAR sensor and the object, and is different for each line. For this reason, the conventional method needs the point image pattern generation and FFT process for each line in the azimuth compression process, which amounts almost 20% the computation for the overall SAR image reconstruction process.

SUMMARY OF THE INVENTION

This invention seeks to overcome the foregoing prior art deficiency, and its prime object is to provide a method of fast and high-quality SAR image reconstruction with reduced computation without sacrificing image quality.

The following description is concentrated on the azimuth compression process.

A point image pattern in the azimuth direction is expressed as follows.

$$h_n = \exp[2\pi j(\alpha n^2 + \beta n)] \qquad (1)$$

where n is an integer representing the sample number, and $\alpha$ and $\beta$ are Doppler parameters, $\alpha$ being reconstruction frequency rate, $\beta$ being Doppler center frequency. The parameters $\alpha$ and $\beta$ are dependent on the distance and relative speed between the satellite and target, and they vary gradually along the direction of range.

In view of the gradual variation of the parameters $\alpha$ and $\beta$, the present invention features to reduce computation by carrying out the point image pattern generation in accordance with the equation (1) and the FFT processing only once for several lines, instead of carrying out these processes for every line. Namely, the inventive method approximates the gradually varying parameters $\alpha$ and $\beta$ with parameters which change stepwise.

DESCRIPTION OF THE PREFERRED EMBODIMENT

Figure 1:
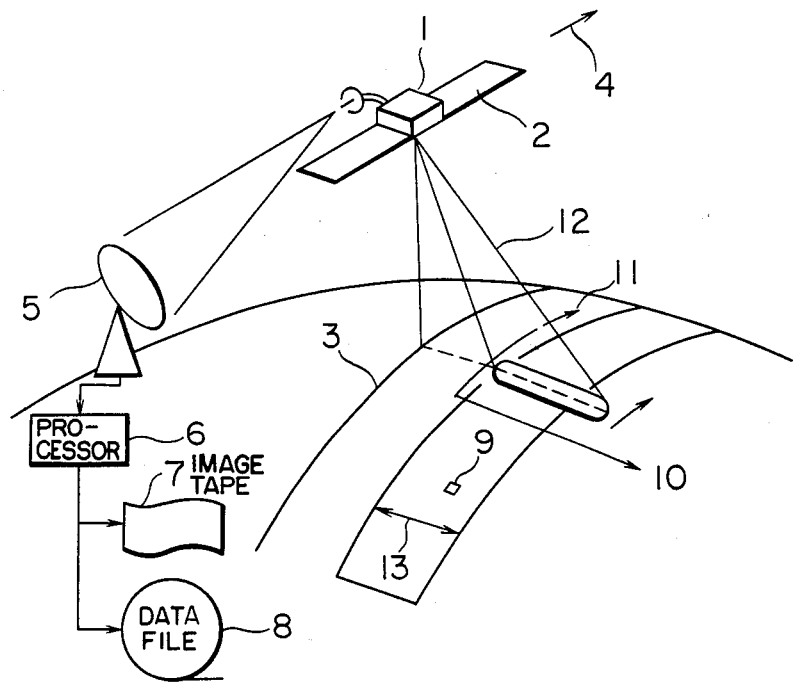
FIG. 1 is an illustration showing in general the SAR system.

In FIG. 1, an SAR equipment incorporating a radar sensor 1 and antenna 2 is installed on a satellite or the like and operated to collect images of the ground surface while moving on a flight path 3 in the direction shown by the arrow 4. Image data is transmitted from the SAR equipment to a ground station 5, in which data is processed by a processor 6 and then image films 7 and magnetic data files 8 are produced. Reference number 9 denotes a resolution cell, 10 indicates the range direction on the ground surface, 11 indicates the azimuth direction on the ground surface, 12 indicates the beam of the antenna, and 13 indicates the swath.

Figure 2:
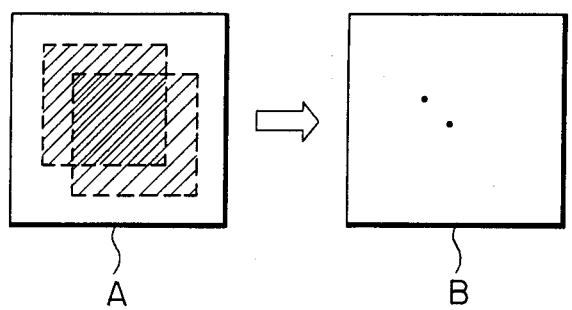
FIG. 2 is an illustration showing the principle of SAR image reproduction.

Information spreading in the received image data is first compressed in the range direction, and then compressed in the azimuth direction, as shown in FIG. 2. FIG. 2 illustrates by A the received image in the case when the microwave reflects at only two points on the ground surface, and illustrates by B the ground surface pattern reconstructed through the compression processes in two directions.

Figure 3:
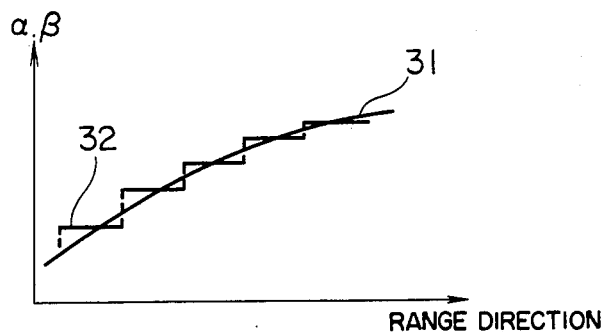
FIG. 3 is a diagram used to explain the approximation of the Doppler parameters.

Next, the principle of this invention will be described. The inventive method resides in the approximation of the gradually varying parameters $\alpha$ and $\beta$ by steps as shown in FIG. 3. In FIG. 3, curve 31 represents the actual value of $\alpha$ or $\beta$, and it is approximated by a series of steps 32. However, this approximation causes the discontinuity of position and phase in the reconstructed image at positions of transition of $\beta$, resulting in a degraded image. This phenomenon will be explained in the following.

When a single point reflecting the radio wave exists on the ground surface, SAR surveillance data $g_n$ of one line is expressed as follows.

$$g_n = \exp[2\pi j(\alpha n^2 + \beta n)] \tag{2}$$

Although in general cases linear superimposition of patterns is applied, the following discussion assumes the presence of only one point on the ground surface for the purpose of simplicity. The point image patterns of equations (1) and (2) are correlated and then compressed, with the result $f_n$ expressed as follows.

$$\begin{aligned}
f_n &= {}_k\Sigma\, g_{n+k} h_k^* \\
&= {}_k\Sigma \exp[2\pi j\{\alpha(n+k)^2 + \beta(n+k) - \alpha k^2 - k\}] \\
&= A(n)\exp[2\pi j(\alpha n^2 + \beta n)]
\end{aligned} \tag{3}$$

where:

$$A(n) = {}_k\Sigma \exp[2\pi j(2\alpha nk)] \tag{4}$$

The term A(n) represents a point image which is compressed by a function, and it has a peak at n=0.

In case the Doppler parameter $\beta$ includes error $\delta\beta$, the point image pattern becomes as follows.

$$\tilde{h}_n = \exp[2\pi j(\alpha n^2 + (\beta + \delta\beta)n)] \tag{5}$$

The result $\tilde{f}_n$ of compression of the surveillance data g(n) of equation (2) with the point image pattern of equation (5) gives, $$\begin{aligned}
\tilde{f}_n &= {}_k\Sigma g_{n+k}\, \tilde{h}_k^* \\
&= {}_k\Sigma \exp[2\pi j\{(2\alpha n - \delta\beta)k + \alpha n^2 + \beta n\}] \\
&= A\left(n - \frac{\delta\beta}{2\alpha}\right)\exp[2\pi j(\alpha n^2 + \beta n)]
\end{aligned} \tag{6}$$

As shown by equation (6), the compressed point image has a positional displacement which is proportional to the error $\delta\beta$ included in the parameter $\beta$.

In order to correct the displacement, the inventive method employs the multiplication of the phase rotation factor in the frequency domain. IFFT which is performed in azimuth compression is expressed as follows.

$$f_n = \sum_{k=0}^{n-1} F_k \exp\left(2\pi j\, \frac{nk}{N}\right) \tag{7}$$

where $F_k$ represents a result of multiplication of the result of FFT of the point image pattern multiplied by the result of FFT of the surveillance data, and N represents the number of data points.

When $F_k$ is multiplied by the phase rotation factor exp $$\left(2\pi j\, \frac{\phi k}{N}\right),$$

and thereafter subjected to IFFT, the following result $f'_n$ is obtained, $$f'_n = \sum_{k=0}^{n-1} F_k \exp\left[2\pi j\, \frac{(n+\phi)k}{N}\right] = f_{n+\phi} \tag{8}$$

This resulted is equal to that obtained by adding the positional displacement $\phi$ to $f_n$.

Accordingly, through the multiplication by a proper phase rotation factor in the frequency domain, the positional displacement in equation (6) can be corrected. The result $f_n$ of the correction is shown as follows:

$$\begin{aligned}
f_n &= A(n)\exp\left[2\pi j\left\{\alpha\left(n + \frac{\delta\beta}{2\alpha}\right)^2 + \beta\left(n + \frac{\delta\beta}{2\alpha}\right)\right\}\right] \\
&\approx A(n)\exp\left[2\pi j\left\{\alpha n^2 + \beta n + \frac{\beta\delta\beta}{2\alpha}\right\}\right]
\end{aligned} \tag{9}$$

Equation (9) indicates that in $\tilde{\tilde{f}}_n$ a phase displacement of $$2\pi\, \frac{\beta\delta\beta}{2\alpha}.$$

is generated. The phase displacement, as well as the positional displacement, causes a degraded image, and must be corrected. Since the phase displacement is constant for each line independently of the sample number n, the phase displacement can be corrected concurrently at the correction of the positional displacement given by equation (6).

Consequently, through the multiplication of a phase rotation factor in the frequency domain as expressed in the following expression (10), both the positional and phase displacements caused by the omission of point image pattern generation are corrected, whereby the impairment of reconstructed images can be prevented.

$$F_k \to F_k \exp\left[2\pi j\left(\frac{\delta\beta k}{2N\alpha} - \frac{\beta\delta\beta}{2\alpha}\right)\right] \tag{10}$$

The phase displacement can also be corrected separately from the positional displacement, by the multiplication of a phase rotation factor in the real time domain.

Figure 4:
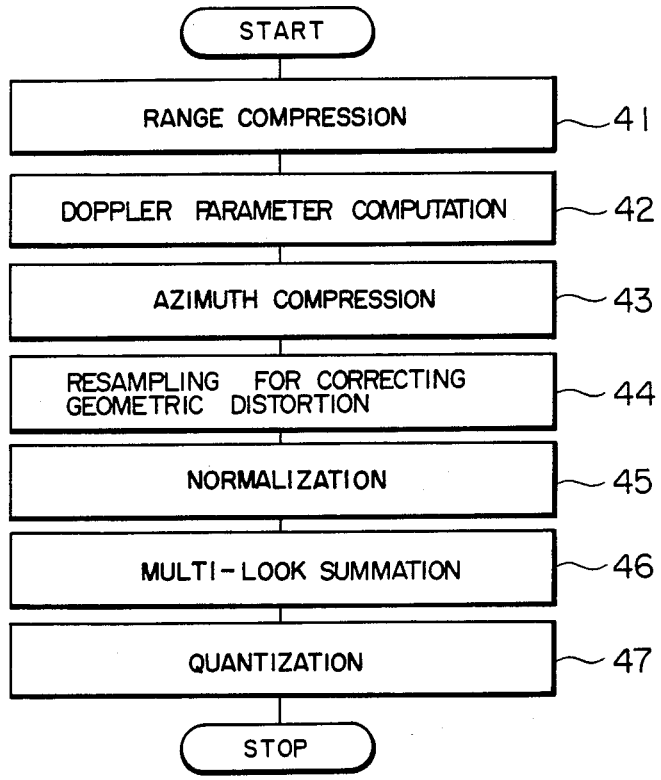
FIG. 4 is a general flowchart of the SAR image reconstructing process.

FIG. 4 shows a flowchart of the overall SAR image reconstruction process. Surveillance data is first compressed in the range direction in the range compression process 41. Subsequently, prior to azimuth compression, the computational process 42 for obtaining the Doppler parameters from the orbit and attitude parameters of the satellite is conducted, and then the data is compressed in the azimuth direction using the Doppler parameters in the azimuth compression process 43. Subsequently, the geometric distortion corrective resampling 44 is conducted so as to correct distortions in the compression result. The resampling is carried out for data in complex number in consideration of the frequency band width of the reconstructed image. Thereafter, the normalization process 45 is conducted to convert the data into the real number. After the multi-look summation process 46 has been conducted for noise reduction, the quantizing process 47 is conducted, and a final image is produced.

Figure 5:
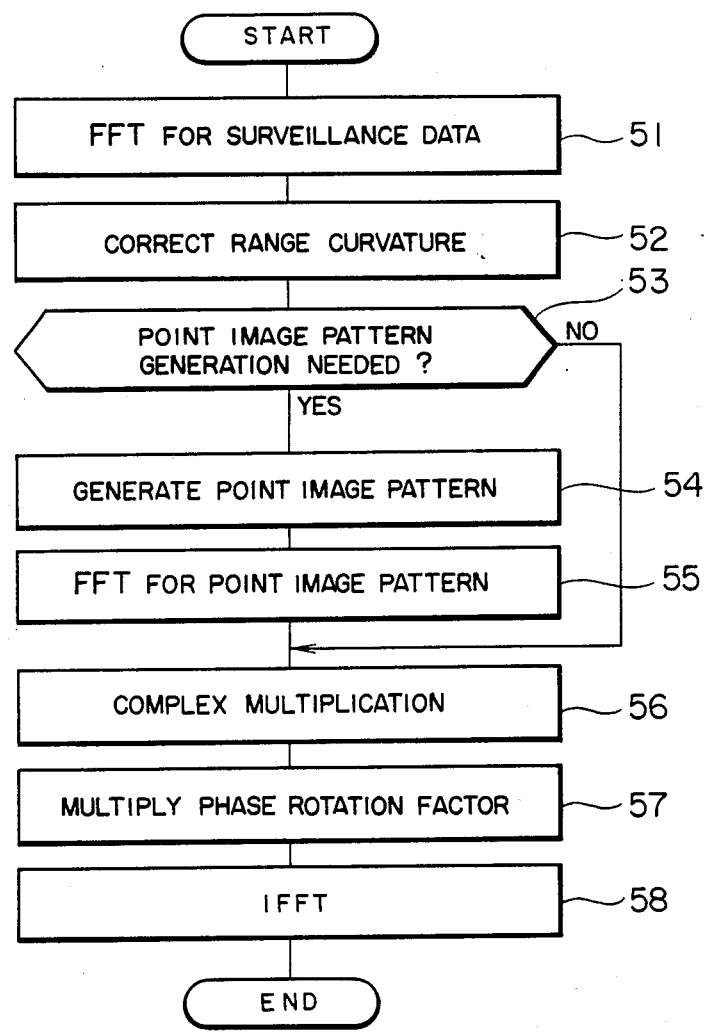
FIG. 5 is a detailed flowchart of the azimuth compression processing in FIG. 4.

FIG. 5 shows in detail the processing for one line by the azimuth compression process 43 in FIG. 4 pertaining to this invention.

Initially, the range-compressed surveillance data is subjected to FFT process 51, and after the data has been converted into the frequency domain, the range curvature correction 52 is conducted for correcting the distance variation between the satellite and the ground object. Processing step 53 tests whether or not the generation of a point image pattern is necessary. For example, if it is intended to generate a point image pattern once for 16 lines, the processing step 53 divides the current line number by 16 and makes a decision depending on the residual of the division. If the decision of prompting the point image pattern generation is made, the sequence is followed by the point image pattern generating process 54 and then the FFT process 55. In another case, the sequence proceeds to step 56 in which processing takes place using previously generated data. Processing step 56 performs complex multiplication for the result of the range curvature correction 52 and FFT-processed point image pattern.

Subsequently, in processing step 57, the phase rotation factor: exp $$\left[2\pi j\left(\frac{\delta\beta k}{2N} - \frac{\beta\delta\beta}{2\alpha}\right)\right],$$

where $\delta\beta=\beta'-\beta$ and N is the number of data points, for correcting the positional and phase displacements from the Doppler parameters $\alpha$ and $\beta$ of the current line and the Doppler parameter $\beta'$ used in the point image pattern generation is produced in accordance with equation (10), and it is multiplied by the result of the process 56. Finally, IFFT process 58 is conducted to obtain the azimuth compression result.

As described above, according to this embodiment it is possible to omit the generation of the point image pattern and FFT of the generated point image pattern such that the generation of the pattern and FFT thereof are each carried out once for 16 lines, reducing computation drastically, whereby the overall process can effectively be sped up.

Accordingly, this invention allows the omission of the most of the point image pattern generation in the azimuth direction and FFT thereof in the SAR image reproduction process without causing deterioration of the quality of the reconstructed image, and thus is effective for reducing computation and speeding up the SAR image reconstruction process.

We claim:

1. In an image processing system for reconstructing an image formed of plural lines from synthetic aperture radar's data, a method of synthetic aperture radar image reconstructing comprising the steps of generating a point image pattern in correspondence to each point of an original image, and performing fast Fourier transformation for the generated point image pattern and image data for one line, wherein said image has n lines and x lines of said n lines are processed, x being less than n, said processing steps being implemented for lines spaced by a predetermined plural number of lines.

2. A synthetic aperture radar image reconstructing processing method according to claim 1, wherein said point image pattern includes a Doppler center frequency as a Doppler parameter, and wherein a positional displacement and phase displacement on a reconstructed image caused by an error included in said Doppler center frequency are corrected by multiplying a phase rotation factor to a product of a fast Fourier transformed point image pattern and single line image data.

* * * * *